(12) United States Patent
Walsh

(10) Patent No.: US 7,779,786 B2
(45) Date of Patent: Aug. 24, 2010

(54) REMOVABLE SEED DEFLECTOR FOR A BIRD FEEDER

(75) Inventor: John E. Walsh, Norfolk, MA (US)

(73) Assignee: Aspects, Inc., Warren, RI (US)

( * ) Notice: Subject to any disclaimer, the term of this patent is extended or adjusted under 35 U.S.C. 154(b) by 730 days.

(21) Appl. No.: 11/745,484

(22) Filed: May 8, 2007

(65) Prior Publication Data

US 2007/0266950 A1    Nov. 22, 2007

Related U.S. Application Data

(60) Provisional application No. 60/746,792, filed on May 9, 2006.

(51) Int. Cl.
    *A01K 61/02*      (2006.01)
(52) U.S. Cl. .................................... 119/57.9
(58) Field of Classification Search .......... 119/51.01, 119/52.1–52.4, 53.5, 54, 57.8, 57.9, 56.1, 119/56.2, 57.4; D30/124–128
See application file for complete search history.

(56) References Cited

U.S. PATENT DOCUMENTS

| | | | |
|---|---|---|---|
| 2,216,511 A | | 10/1940 | Copeman |
| 3,090,354 A | | 5/1963 | Merritt et al. |
| 3,811,412 A | * | 5/1974 | Murto et al. ............... 119/53 |
| 4,223,637 A | | 9/1980 | Keefe |
| 4,259,927 A | | 4/1981 | Clarke |
| 4,738,221 A | * | 4/1988 | Nock ...................... 119/52.2 |
| 4,892,060 A | | 1/1990 | Lundquist |
| 5,406,907 A | * | 4/1995 | Hart ......................... 119/53 |
| 5,465,683 A | | 11/1995 | Reisdorf |
| 5,680,829 A | | 10/1997 | Payne |
| 5,718,187 A | * | 2/1998 | Pollock et al. ............ 119/52.4 |
| 5,775,257 A | | 7/1998 | Park |
| 5,791,286 A | | 8/1998 | Taussig et al. |
| 5,794,562 A | * | 8/1998 | Hart ....................... 119/52.4 |
| 5,829,382 A | | 11/1998 | Garrison |
| 5,829,385 A | * | 11/1998 | Kaspersen ................. 119/54 |
| 5,884,581 A | * | 3/1999 | Vandaele ................. 119/52.4 |
| 6,116,471 A | * | 9/2000 | Miller ....................... 222/199 |
| 6,253,706 B1 | | 7/2001 | Sloop |

(Continued)

FOREIGN PATENT DOCUMENTS

EP      1483960 A1    8/2004

(Continued)

OTHER PUBLICATIONS

Shaw Creed Bird Supply, www.shawcreekbirdsupply.com/thistle_feeders.

*Primary Examiner*—Thomas Price
(74) *Attorney, Agent, or Firm*—Barlow, Josephs & Holmes, Ltd.

(57) ABSTRACT

A removable seed deflector for a bird feeder is disclosed that can be installed into the bottom open bottom end and a side wall of the bird feeder. A base member interfittingly engages the bottom end of the tubular body member. The base member includes at least one aperture defining at least one seat, respectively. The base member is releasably secured to the tubular body member of a feeder. A seed deflector is releasably secured to the base member and includes at least one downwardly depending leg that releasably engages with the seats, respectively, in the base member.

20 Claims, 7 Drawing Sheets

U.S. PATENT DOCUMENTS

| | | |
|---|---|---|
| 6,453,843 B2 | 9/2002 | Bescherer |
| 6,543,383 B1 | 4/2003 | Cote |
| 6,578,518 B1 * | 6/2003 | Conforti ................ 119/57.8 |
| 6,591,781 B2 * | 7/2003 | Hardison ............... 119/57.9 |
| 6,701,867 B1 | 3/2004 | Garrison |
| 6,758,164 B2 | 7/2004 | Rich |
| 6,834,616 B2 * | 12/2004 | Fort, II .................. 119/57.8 |
| 7,143,719 B1 * | 12/2006 | Giddens et al. ........ 119/51.01 |
| 7,392,763 B2 * | 7/2008 | Willinger et al. ........ 119/464 |
| 7,540,260 B2 * | 6/2009 | Rich et al. ............. 119/57.9 |
| 7,647,888 B2 * | 1/2010 | Slankard et al. ........... 119/53 |
| 2001/0032592 A1 | 10/2001 | Bescherer |
| 2003/0033985 A1 | 2/2003 | Hardison |
| 2003/0150391 A1 | 8/2003 | Rich |
| 2005/0005865 A1 | 1/2005 | Rich et al. |
| 2005/0011463 A1 | 1/2005 | Nock |

FOREIGN PATENT DOCUMENTS

| | | |
|---|---|---|
| GB | 2287635 A | 9/1995 |

* cited by examiner ial Application Ser. No. 60/746,792, filed May 9, 2006,
REMOVABLE SEED DEFLECTOR FOR A BIRD FEEDER

CROSS-REFERENCE TO RELATED APPLICATION

This application claims priority to earlier filed U.S. Provisional Application Ser. No. 60/746,792, filed May 9, 2006, the contents of which are incorporated herein by reference.

BACKGROUND OF THE INVENTION

1. Field of the Invention

The present invention generally relates to bird feeders, namely, tubular bird feeders. More specifically, the present invention relates to bases and seed deflectors for such tubular bird feeders.

2. Background of the Related Art

In the bird feeder industry, tubular bird feeders are very well known. These feeders include a tubular main feed body which is commonly transparent or translucent so the amount of feed remaining therein can be easily seen. Feed ports in the tubular body permit birds to gain access to the feed therein. A tubular bird feeder also typically includes a number of perches routed through or attached to the tubular body to support a bird during feeding through one of the feed ports.

A tubular bird feeder typically has an open top and bottom end. The top end is covered by a removable cap so feed may be introduced into the tubular body. Bails are also provided so the feeder can be hung from a support, such as a hook or other structure. The bottom of the main tubular body is also closed, typically permanently, by a bottom base or cap. This base is usually screwed on, riveted or otherwise fixedly secured to the bottom of the tubular main body to keep it closed. A post mount can be provided in the bottom of the bottom cap. Typically a post mount is threaded into a female-threaded aperture in the bottom of the base.

The bases of prior art tubular bird feeders usually extend up into the tubular body. The top surface of the base of the feeder is commonly tapered or angled in some fashion to direct feed toward one or more of the feed ports at the lowermost portion of the tubular main body. This ensures that birds can gain access to all of the feed within the tubular feeder and that no feed goes to waste.

These known tubular feeders suffer from various problems that make them difficult to maintain. Remaining amounts of feed typically accumulate at the bottom of the feeder. When this feed mixes with rain, and the like, the feed at the lower portion of the feeder becomes packed and dirty making it difficult, if not impossible, for birds to access it. Moreover, once the feed is wet and/or dirty, birds may not even wish to consume it. Since the bases of these known tubular feeders are secured to the bottom of the feeder, they are difficult to remove. If a base is permanently secured to the bottom of the feeder, it will not be able to be removed. Threaded fasteners, rivets and other permanent devices are used to secure the base, with a seed deflector thereon, to bottom of the tubular main body. These fasteners require tools, such as a screwdriver or wrench, to remove the base for cleaning the feeder. The requirement of tools increases the burden of cleaning a feeder and further makes a bird feeder owner less likely to clean their feeder. If, for example, rivets are used, it may not even be possible to remove the base at all to gain access to the bottom of the tubular portion of the feeder.

Some seed deflectors are integrally constructed with the base, which is usually permanently attached to the housing of the feeder making it virtually impossible to effectively clean the feeder. Thus, the enclosed end of the feeder where the seed deflector is located is particularly hard to clean. To further cause cleanliness problems, seed deflectors are often formed of a separate construction from the base. For example, the base member may be metallic while a seed deflector made of plastic is permanently secured thereon, such as by screws or rivets. Dirt, grime and bacteria can easily collect between and about the separate seed deflector and base parts.

Therefore, it is highly desirably to not only gain access to the base of a bird feeder to generally clean it but there is a desire to gain full access to the seed deflector as well to clean it thoroughly to remove all of the dirt, grime and bacteria that has collected. It is also desirable for a user to be able to easily change the base for aesthetic reasons. However, it is not possible to disassemble prior art seed deflectors from their base because they are permanently attached thereto. As a result, there is a need for a seed deflector for a bird feeder than be easily detached from the base so that it can be quickly and easily cleaned.

Also, there is a desire in the art of bird feeders to simply and unify the assembly of bird feeder bases and seed deflectors. As stated above, seed deflectors can be either integrally attached to the base or permanently affixed thereto by rivets, fasteners and the like. There also needs to be a way to easily change a seed deflector so that it can meet the needs of the user without having to change the entire base configuration. Furthermore, there is a need for a bird feeder base and seed deflector configuration where a single base can be used for a wide array of bird feeder sizes and shape where the seed deflector can be easily changed to suit the base construction to the particular feeder environment and feed port pattern at hand.

For example, there is a desire for the same base to be used, but the seed deflector can be interchangeable depending on the seed type to be placed in feeder. Also, there is a desire for the same base to be compatible with feeders of different sizes to facilitate the manufacturing process to reduce the number of parts across a line of feeders. Also, it is possible that the use may wish to change the color of the seed deflector to, in turn, change the appearance of the feeder to add interest or, perhaps, attract different types of birds to the feeder.

SUMMARY OF THE INVENTION

The present invention provides a solution to the problems associated with prior art tubular bird feeders. The present invention includes a new and novel interchangeable and easily removable seed deflector and universal base that permits the entire base construction to be quickly and easily removable from the bottom of the main tubular body of a feeder to facilitate cleaning thereof. The present invention provides a seed deflector construction that can be easily disassembled from the universal base to permit full and completely cleaning thereof. The new seed deflector also allows for the single universal base to be used for a wide range of bird feeders where only the seed deflector is changed for the given bird feeder construction. This obviates the need for multiple bases for a range of bird feeder constructions. Also, the present invention permits the seed deflector to be easily modified to suit the aesthetic appearance of the feeder.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENTS

Figure 1:
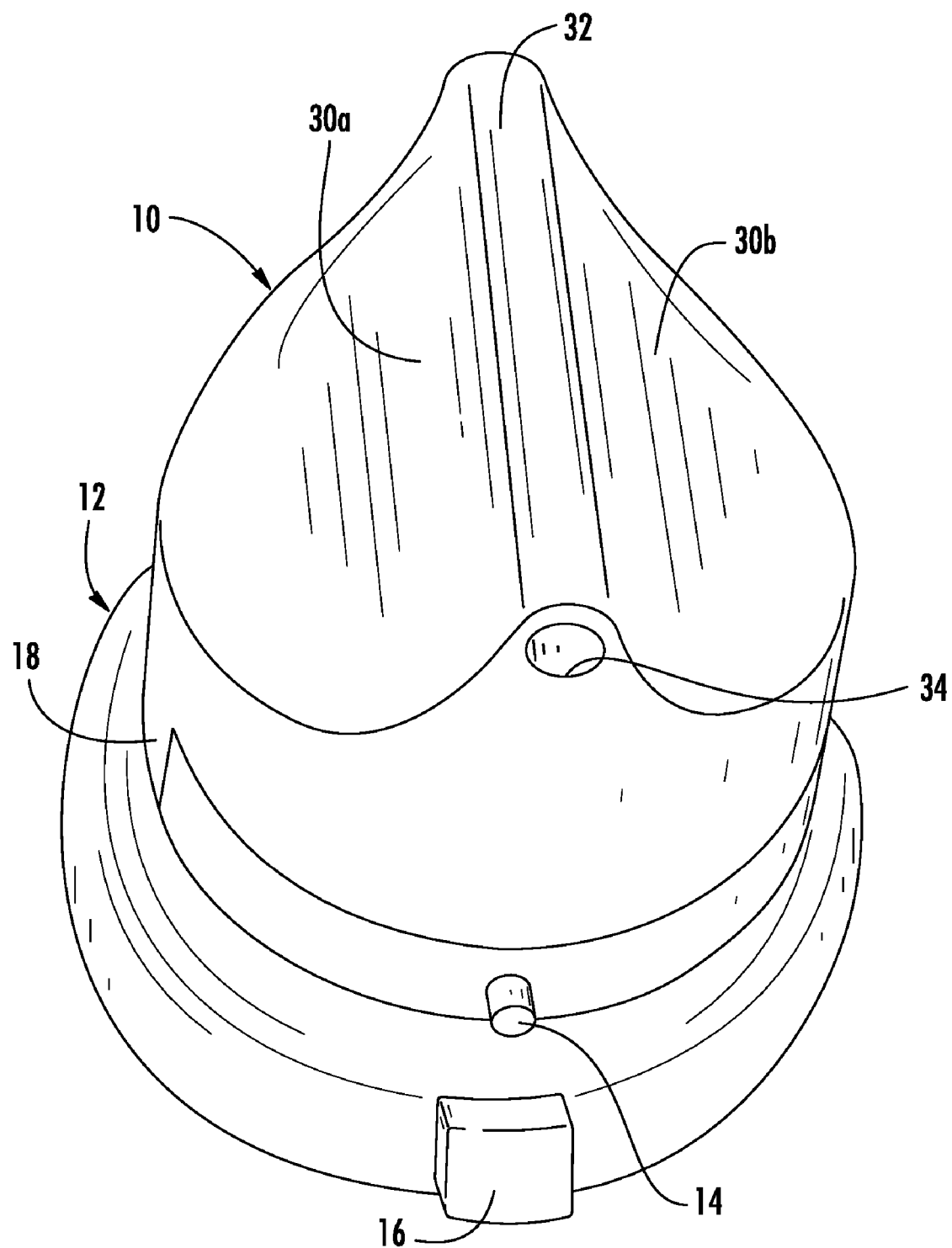
FIG. 1 is a side perspective view of a bird feeder base with an embodiment of a removable seed deflector assembled thereto.
Figure 2:
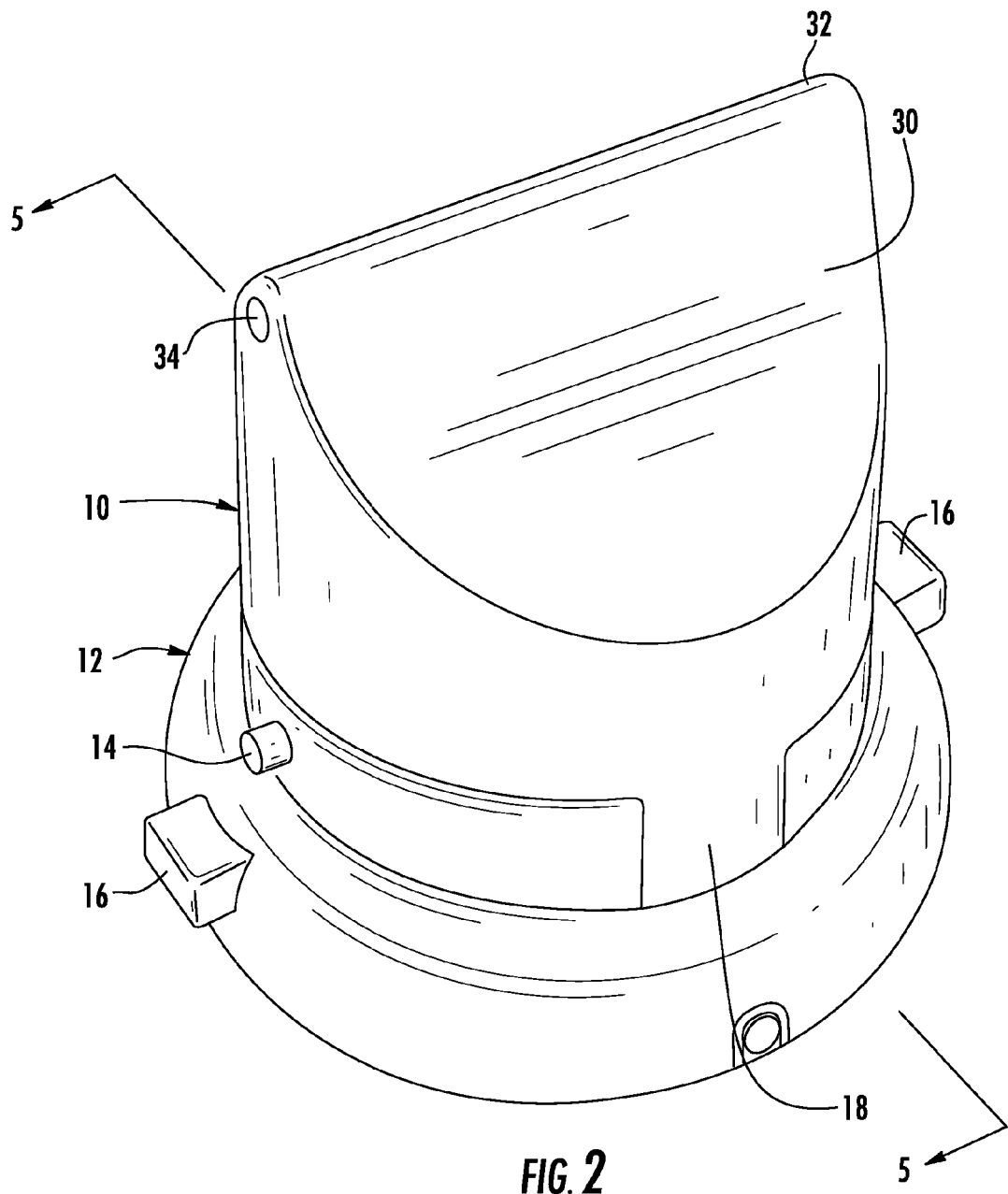
FIG. 2 is front perspective view thereof.

Turning now to the attached drawings, the seed deflector and universal base are shown in detail. In FIGS. 1 and 2, the seed deflector 10 and universal base 12 of the present invention is shown to include the seed deflector 10 affixed to the top of the base 12. Spring-loaded pins 14, actuated by buttons 16 that engage with apertures on a tube of a feeder (best seen in FIG. 7), are one way of many ways to releasably secure a tubular feeder body to the base 12 and seed deflector 10. Such a releasable construction is disclosed in co-pending U.S. Ser. No. 11/069,878, which is commonly owned with the instant application, and is incorporated herein by reference.

Figure 3:
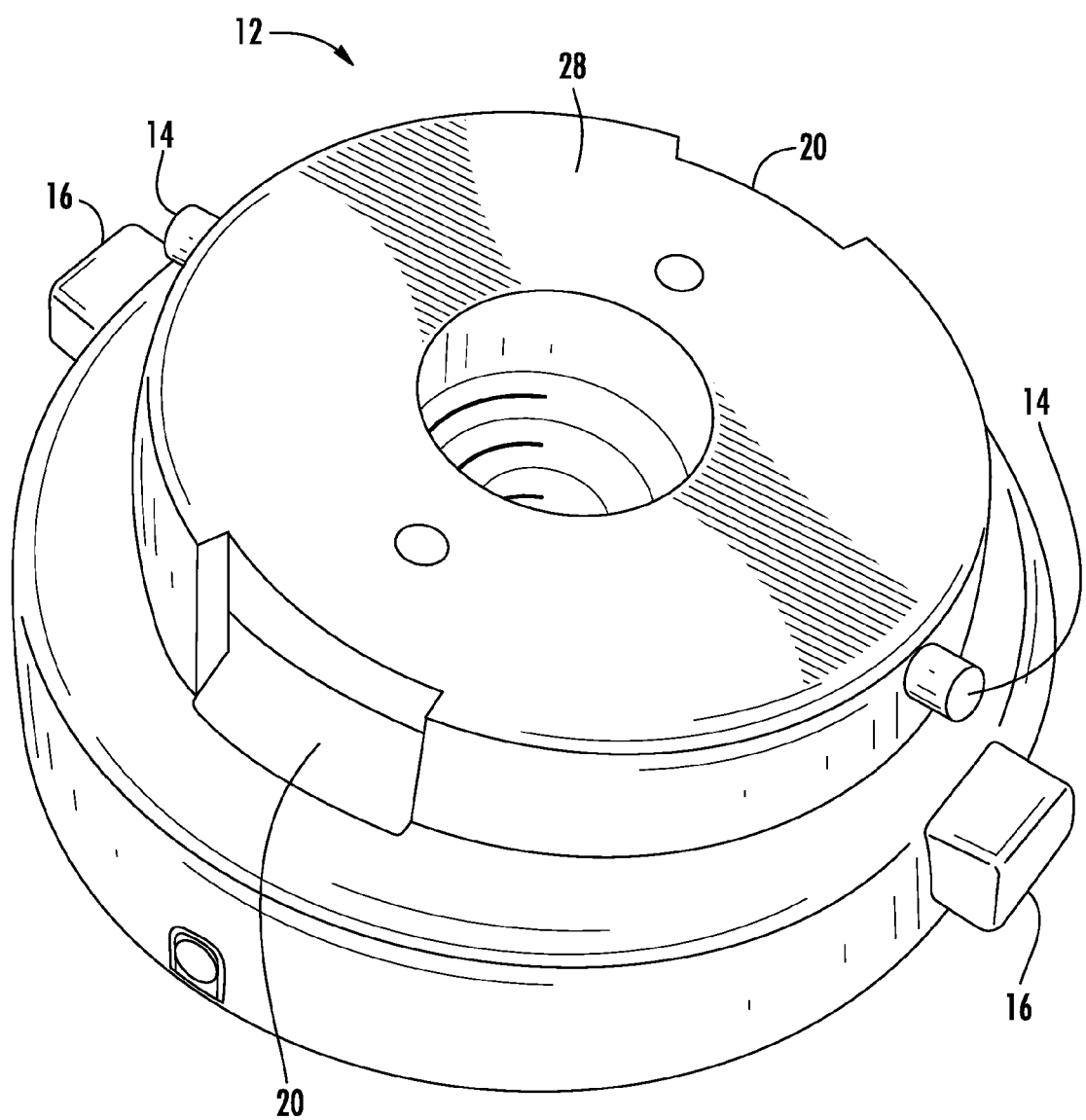
FIG. 3 is a perspective view of a bird feed base with the seed deflector removed therefrom.
Figure 4:
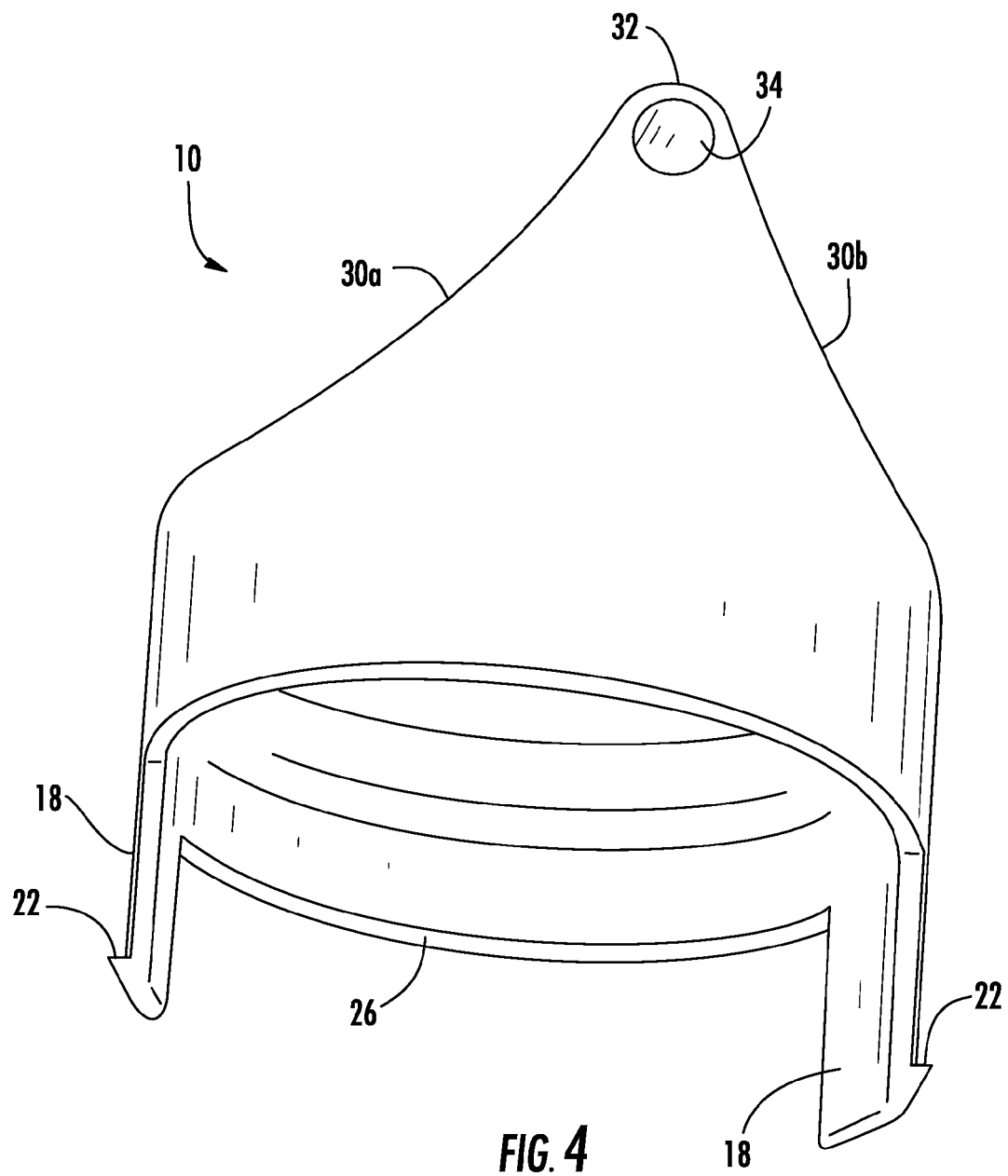
FIG. 4 is a bottom perspective view of an embodiment of a seed deflector.

In FIGS. 1 and 2, it can be seen that downwardly depending legs 18 of the seed deflector 10 engage with the base 12. As seen in FIG. 3, the base includes a number of notches or seats 20 for respective receipt of the downwardly depending legs 18 to releasably secure the seed deflector 10 in place. The legs 18 each, preferably, have an outwardly extending flanges 22 from the free ends thereof, as seen in FIG. 4.

Figure 5:
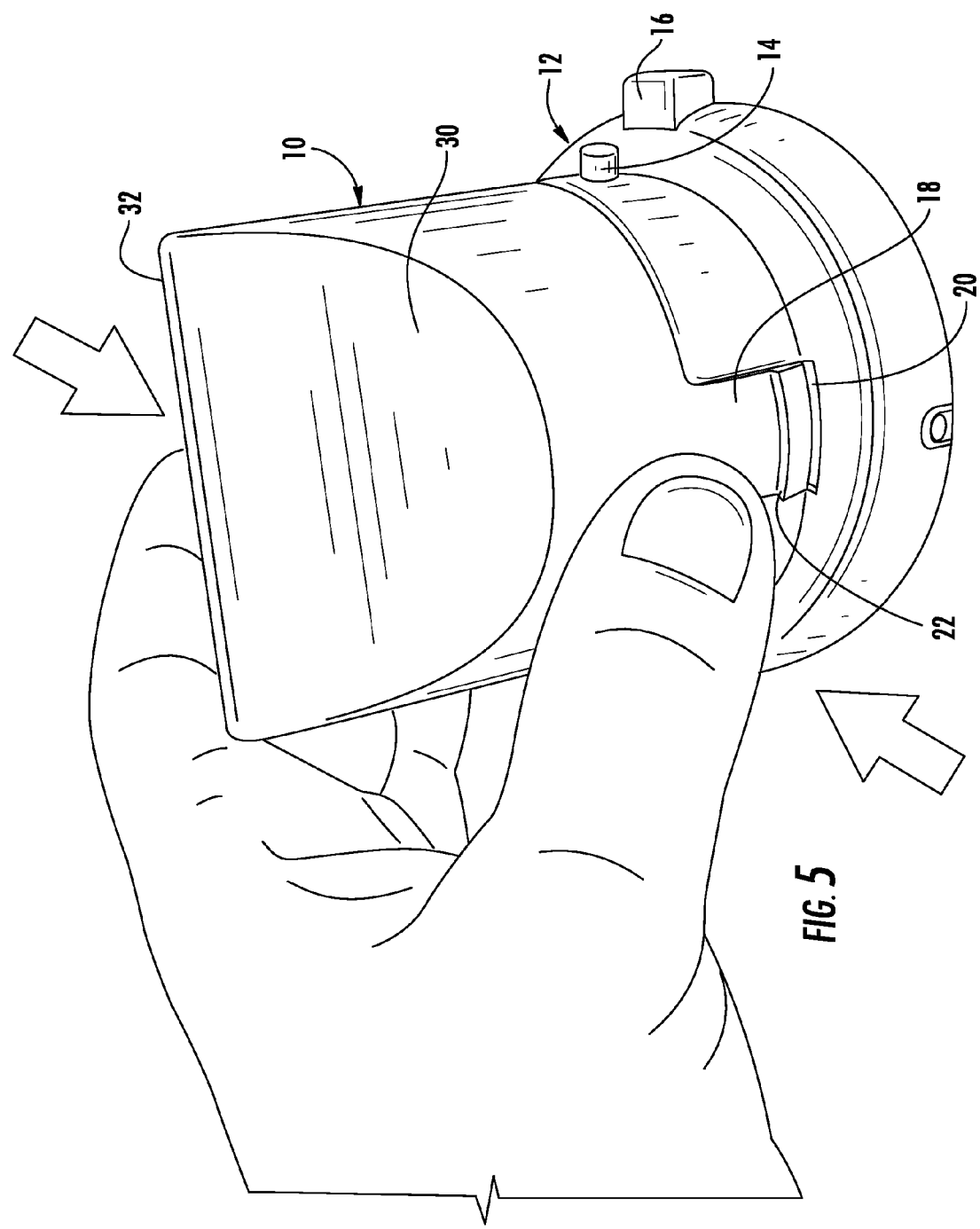
FIG. 5 is a side cross-section view through line 5-5 of FIG. 2.
Figure 6:
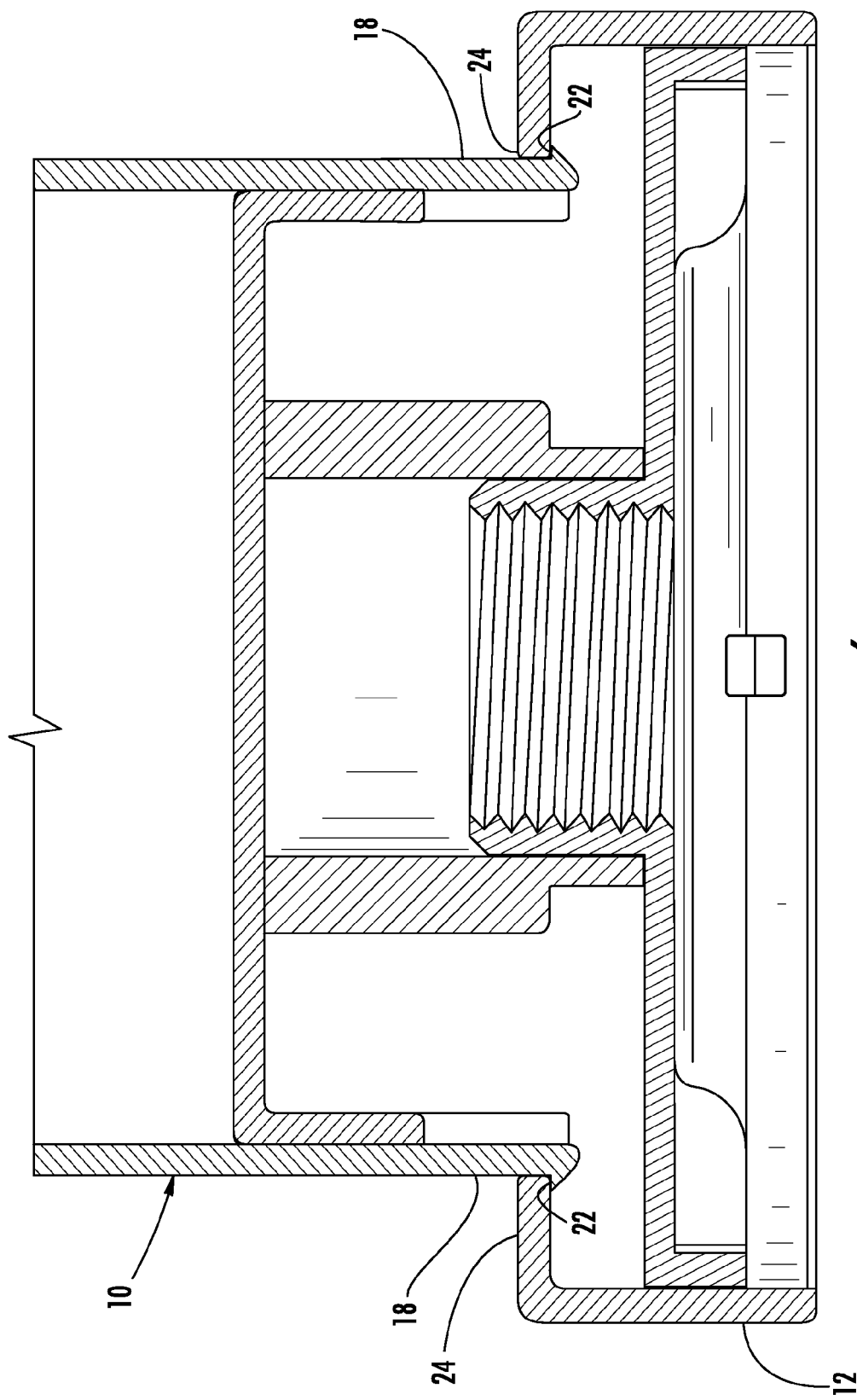
FIG. 6 is a perspective view of a person removing the seed deflector from the bird feeder base.

In FIG. 5, the preferably opposedly positioned legs 18 are squeezed together so that their respective flanges 22 on the free ends can be depressed slightly so that they can clear the outer edge 24 of the seats 20 in the base 12. For example, the flanges 22 in the legs 18 can be complementarily mated with a ridge or edge 24 in the base 12 when positioned into place. Moreover, when the bottom edge 26 of the seed deflector 12 mates with the top surface 28 of the base 12, the legs 18 can be released so that they spring back to their resting condition, as seen in FIG. 4 or 6. There can be many different configurations of the location of the seed deflector 10 and the base 12 and the embodiment shown herein is just one of many different possible configurations within the scope of the present invention. While two opposing legs are preferred, more or less than 2 legs can be used in accordance with the present invention.

When the legs 18 are released, as in FIG. 6, the flanges 22 on the free ends of the legs 18 communicate with the base 12 to secure the seed deflector 10 in place. The present invention contemplates any type of construction where the seed deflector 10 can be removably attached to the base 12. The assembled seed deflector 10 and base 12 is now ready for installation to a bird feeder housing, such as by using the retractable pins 14 and buttons 16 arrangement. The seed deflector 10 has one or more contoured seed deflecting surfaces 30a, 30b, and collectively as 30. In this embodiment, there are two seed deflecting surfaces 30a, 30b and the slope is relatively steep and the centerline 32 is relatively tall. Also, a transverse through hole 34 is optionally provided for routing a perch or other component therethrough (not shown). For example, a perch may be routed through opposing apertures in the tube of a feeder to help secure the seed deflector 10 in place.

The seed deflector 10 and base 12 can now be installed into a feeder housing for use. The housing may be permanently attached, using rivets, screws, or the like. However, for easy access to the seed deflector 10 for cleaning, it is desirable that the housing be easily removably form the base 12 and seed deflector 10 as well. For example, the housing may be removably attached using the construction in commonly owned Ser. No. 11/069,878 shown in figures thereof.

As can be understood, the ability to easily remove a seed deflector 10 adds greatly flexibility in the manufacture of bird feeders. More specifically, as mentioned above, the base 12 can now serve as a universal base that can be used in feeders of different configuration and sizes. For example, the same base can be used for 2¾ inch diameter tubular feeder, a seed tube, thistle tube, peanut feeder and Nyjer mesh by simply adapting the configuration of the seed deflector 10 to suit the given feeder environment, such as a particular feed port pattern. Such adaptation of the seed deflector 10 may be to vary the characteristics thereof, such as the slope, height, width, concavity, and the like, and even color or transparency for aesthetic or attractant purposes. With the present invention, the appropriate seed deflector 10 can be simply snapped in place to adapt the base 12 to the given feeder and then immediately installed into the bottom opening of the tube of the feeder.

For example, an alternative configuration of the shape and configuration of the seed deflector 10, in accordance with the present invention, the seed deflector 10 can be made shorter than the deflector shown in FIGS. 1-6. The height of this seed deflector 10 may be adjusted for deflecting certain feeds and for certain feeder constructions. Besides adjusting the overall height of the seed deflector 10, the slope of the deflecting surfaces 30 may also be changed. Moreover, the deflecting surfaces 30 may include more than the two opposed deflecting surfaces 30a, 30b shown or even a single surface. For instance, the deflecting surface 30 could be conical-shaped. Additionally, the seed deflector 10 could have a flat deflecting surface 30 or even a convex shape. The seed deflector 10 may also be constructed from a material having a translucent appearance as a design element to make the feeder more attractive. Other colors may also be used.

The seed deflector 10 of the present invention is preferably made of plastic for ease of manufacture and reduced cost. It may also be metal or a combination of metal and plastic or any other material that is suitable to permit the operation of the seed deflector 10 as described herein.

Figure 7:
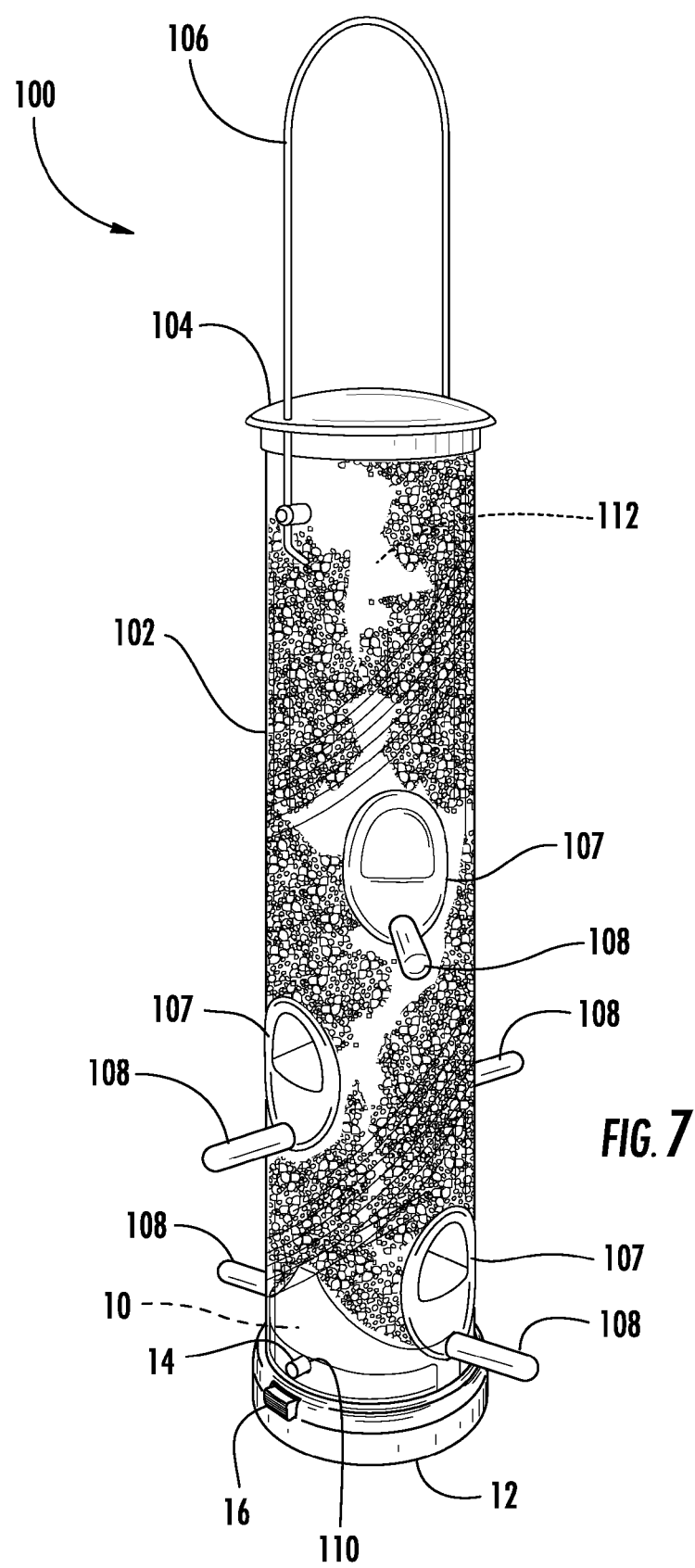
FIG. 7 is a perspective view of a bird feeder with the removable base and seed deflector assembled thereto.

Referring the FIG. 7, an assembled bird feeder is generally shown at 100. The assembled bird feeder 100 includes a tubular body 102 having an open bottom end and top end. The top end is enclosed with a cap 104. An optional bail 106 may be attached to the top end of the tubular body 102 and/or cap 104 in order to hang the bird feeder 100. On the sidewalls of the tubular body 102 are a number of feed ports 107 that may contain optional perches 108 extending therefrom. The feed ports 107 provide access for birds to the interior of the tubular body 102. Also on the sidewall of the tubular body 102 are a pair of opposing apertures 110 configured to receive the spring-biased pins 14 of the releasable base 12. With the seed deflector 10 assembled to the base 12, it is interfittingly engaged to the open bottom end of the tubular body 102 and the spring-loaded pins 14 are aligned to interlock with the apertures 110 on the tubular body 102 thereby releasably securing the base member 14 thereto. With the base member 12 secured to the open bottom end of the tubular body 102, the interior of the tubular body may be filled with bird feed 112.

Therefore, it can be seen that the present invention provides a unique solution to the problem of providing a removable see deflector from a bird feeder base that is easy to clean and maintain.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A bird feeder, comprising:
   a tubular body member having an open bottom end and a side wall;
   a base member interfittingly engaged with the open bottom end of the tubular body member; the base member including at least one aperture defining at least one seat, respectively;
   means for releasably securing the base member to the tubular body member;
   a seed deflector releasably secured to the base member; the seed deflector including at least one downwardly depending leg that releasably engages with the at least one seat in the base member; and
   whereby the seed deflector can be easily removed from the base for easy cleaning and adaptation to a bird feeder construction at hand.

2. The bird feeder of claim 1, wherein the base member includes a plurality of seats and the seed deflector includes a plurality of downwardly depending legs; said plurality of downwardly depending legs respectively engage with the plurality of seats.

3. The bird feeder of claim 2, where the plurality of seats is a pair of seats and the plurality of downwardly depending legs is a pair legs.

4. The bird feeder of claim 1, wherein the seed deflector further comprises a deflection surface having at least one apex.

5. The bird feeder of claim 4, wherein the deflection surface has at least one concave portion.

6. The bird feeder of claim 5, wherein the deflection surface includes two concave portions.

7. The bird feeder of claim 1, wherein the seed deflector further comprises an aperture defining a through hole configured to receive a perch therethrough.

8. The bird feeder of claim 1, wherein the seed deflector is constructed from a unitary piece of plastic.

9. The bird feeder of claim 8, wherein the unitary piece of plastic is translucent.

10. The bird feeder of claim 8, wherein the unitary plastic material is opaque.

11. A seed deflector for a bird feeder, comprising:
    a main body releasably secured to a base member; said base member with main body secured thereto being configured to interfittingly engage with a bottom open end of a tubular body member of a bird feeder; the base member having at least one seat therein; and
    the main body including at least one downwardly depending leg that respectively releasably engages with the at least one seat in the base member.

12. The seed deflector of claim 11, wherein the seed deflector body includes a plurality of downwardly depending legs, respectively.

13. The seed deflector of claim 11, wherein the plurality of downwardly depending legs are a pair of legs.

14. The seed deflector of claim 11, wherein the main body further comprises a deflection surface having at least one apex.

15. The deed deflector of claim 14, wherein the deflection surface has at least one concave portion.

16. The seed deflector of claim 15, wherein the deflection surface includes two concave portions.

17. The seed deflector of claim 11, wherein the seed deflector further comprises an aperture defining a through hole configured to receive a perch therethrough.

18. The seed deflector of claim 11, wherein the seed deflector body is constructed from a unitary piece of plastic.

19. The seed deflector of claim 18, wherein the unitary piece of plastic is translucent.

20. The seed deflector of claim 18, wherein the unitary piece of plastic is opaque.

* * * * *